(12) United States Patent
Pannell et al.

(10) Patent No.: US 7,385,749 B2
(45) Date of Patent: Jun. 10, 2008

(54) SILICON ACOUSTO-OPTIC MODULATOR

(75) Inventors: Christopher N. Pannell, Orlando, FL (US); Thomas Stenger, Bedford, OH (US); Jonathan David Ward, Ilminster (GB); Melvin E. Pedinoff, Thousand Oaks, CA (US); Ramesh K. Shori, Northridge, CA (US)

(73) Assignee: Cleveland Crystals, Inc., Cleveland, OH (US)

( * ) Notice: Subject to any disclaimer, the term of this patent is extended or adjusted under 35 U.S.C. 154(b) by 64 days.

(21) Appl. No.: 11/527,358

(22) Filed: Sep. 26, 2006

(65) Prior Publication Data
US 2007/0171513 A1 Jul. 26, 2007

Related U.S. Application Data

(60) Provisional application No. 60/760,486, filed on Jan. 21, 2006.

(51) Int. Cl.
*G02F 1/11* (2006.01)
*H01S 3/117* (2006.01)
*H01S 3/11* (2006.01)

(52) U.S. Cl. ............ 359/286; 372/313; 372/310; 359/285

(58) Field of Classification Search ........ 359/285–287, 359/305–314; 372/310, 313
See application file for complete search history.

(56) References Cited

U.S. PATENT DOCUMENTS 4,843,335 A * 6/1989 Amano ................ 359/310
5,748,222 A * 5/1998 Roberts ................ 347/241
6,263,004 B1   7/2001 Arvidsson et al.
6,307,665 B1 * 10/2001 Kim et al. .............. 359/311

OTHER PUBLICATIONS

Carleton et al. "Modulation of 10.6 micron laser radiation by ultrasonic diffraction", Applied Physics Letters, vol. 9, No. 3, p. 110-112, (1966).
Biegelsen "Photoelastic tensor of silicon and volume dependence of the average gap", Physical Review Letters, vol. 32, No. 21, p. 1196-1199, 1974; Erratum to this paper: Physical Review Letters, p. 51, vol. 32, 1974.
Biegelsen "Frequency dependence of the photoelastic coefficients of Silicon",Physical Review B, vol. 12, No. 6, p. 2427-2431, (1975).
Xu et al. "Acousto-Optic Devices: Principles, Design and Applications", Wiley Series in Pure and Applied Optics, ISBN: 0471616389, (1992), pp. 47-99.

* cited by examiner

*Primary Examiner*—David N. Spector
(74) *Attorney, Agent, or Firm*—Darby & Darby; Neil R. Jetter

(57) ABSTRACT

An acousto-optic modulator includes a (100), (010) or (001) single crystal silicon acousto-optic interaction medium, and at least one transducer for emitting an acoustic wave attached to the single crystal. The transducer has a first electrode layer disposed on one side and a second electrode layer disposed on its other side. The transducer is aligned to the single crystal so that the direction of acoustic propagation in the silicon crystal is substantially along the (100), (010) or (001) direction. A q-switched laser includes a modulator according to the invention.

8 Claims, 6 Drawing Sheets

SILICON ACOUSTO-OPTIC MODULATOR

CROSS-REFERENCE TO RELATED APPLICATIONS

This application claims priority to U.S. Provisional Patent Application No. 60/760,486 filed on Jan. 21, 2006, and is incorporated by reference in its entirety into the present application.

STATEMENT REGARDING FEDERALLY SPONSORED RESEARCH OR DEVELOPMENT

Not applicable.

FIELD OF THE INVENTION

The invention relates to acousto-optic modulators and related Q-switched lasers.

BACKGROUND

It is frequently desirable for lasers to produce a series of optical pulses of high peak power rather than emit the radiation continuously or in free-running (i.e. long pulse) mode. Such a series of pulses might be desirable for example, for surgical applications, dental applications, for welding, or for remote sensing applications. It is also desirable if the pulses can be obtained on demand, such as responsive to some externally applied electrical trigger signal to the laser's control circuitry.

In order for the laser to produce a series of Q-switched pulses in a controlled manner rather than operate in continuous wave (CW) or free-running mode, an optical modulator is usually placed in the laser cavity in order to modulate the optical loss (or 1/Q) of the cavity. The optical modulator is designed to have low loss in the "ON" state, and high loss in the "OFF" state, and is generally referred to as a Q-switch. The laser gain medium is pumped with the Q-switch in the "OFF" state allowing population inversion to reach a high level. In response to a suitable external trigger signal to the Q-switch driver electronics, the Q-switch assumes the "ON" state, allowing the Q of the laser cavity to rise to a high value. The result of the high Q state is a high intensity optical pulse exiting from the output coupler (mirror) of the laser cavity.

Q-switches for lasers operating in the infrared spectral region are usually one of three main types: (1) acousto-optic, (2) electro-optic or (3) mechanical. The mechanical type comprises a spinning mirror or prism, vane or shutter. Mechanical Q-switches are slow in the sense that pulses generated via this approach have long rise and fall times compared to other types of Q-switches. Furthermore, the moving parts often cause vibration and/or reliability problems. Long rise and fall times in a Q-switch are often undesirable as they limit the ability of the laser system to produce short pulses (<10 ns) with sufficiently high peak power for many applications.

Electro-optic Q-switches can be very fast, and generally provide good performance. However there are a limited number of suitable single-crystal electro-optic materials, which can operate efficiently in certain spectral bands, such as the 2-8 micron region. In addition, suitable available electro-optic materials (such as CdTe) are expensive and not easily obtainable in the form of large homogeneous single crystals, as required for the construction of these devices. The optical damage thresholds and thermal conductivities of these otherwise suitable materials tend to be low, thus making the design and fabrication of reliable Q-switches a difficult if not an impossible task.

Regarding acousto-optic modulators, the basic structure of acousto-optic modulators and the form of the acousto-optic interaction is well known. With reference to FIG. 1(a), a acousto-optic modulator 100 is shown which includes an acousto-optic material 110 having a transducer (T) 105 bonded thereto. The transducer electrodes are not shown. Light is incident on the acousto-optic medium surface from the left and exits as diffracted beams (k=0, ±1, ±2) shown in more detail in FIG. 1(b) due to the acoustic wave caused to propagate in the AO material 110 by bias applied across transducer 105. The k=0 beam represents the undeflected beam. The acoustic wave generated propagates in a direction substantially perpendicular to a direction of the light beam. In an acousto-optic Q-switch, it is usual, but not essential, for the acoustic wave to be absorbed by an absorber placed at the surface CD of the AO material 110 after passing through the region in which the optical beam is present. In the case when absorption of the wave passing through the region in which the optical beam is present is desired, it is also usual to cut the absorbing surface CD at an angle as shown to produce a wedged face in order to frustrate direct reflection of the acoustic energy back to the transducer T.

In the case considered herein, the optical beam processed by modulator 100 is a natural mode or combination of natural modes of a laser cavity and as such has a reasonably well-defined k-vector. If such an optical beam is incident on the optical modulator at or near to the so-called Bragg angle, then a proportion of that light will be converted into one or more diffracted orders as a result of the acousto-optic interaction. The exact performance of such a device in terms of its loss modulation, speed of switching, RF drive power requirements, and angular acceptance can be predicted using standard acousto-optic theory. Of particular importance is the so-called Debye-Sears ratio (often referred to as the Q-parameter), which is a dimensionless number depending on the physical length of the acoustic transducer (L), the optical wavelength ($\lambda$), the acoustic velocity (V), the refractive index (n) and the RF drive frequency used (f) according to:

$$Q = \frac{\pi \lambda L f^2}{nV^2} \qquad (1)$$

Low values of Q indicate that the modulator is working in the Raman-Nath regime where multiple diffracted orders are produced, and the angular acceptance of the modulator is large. This is desirable for example if the laser is multimode leading to optical beams having a larger divergence angle. Larger values of Q (e.g. in excess of 10) mean that the device is working in the Bragg regime where a single diffracted order is produced. This is not a problem in a Q-switch, because all that is desired is to achieve loss modulation, however the angular acceptance of the modulator will be reduced in the Bragg regime, making alignment more critical and possibly truncating the angular extent of the input optical mode(s).

Another important parameter in acousto-optic devices is the so-called $M_2$ figure of merit defined as:

$$M_2 = \frac{n^6 p_{eff}^2}{\rho V^3} \quad (2)$$

where $\rho$ is the density of the material used and $p_{eff}$ is the effective strain-optic coefficient. The strain-optic coefficient is constructed from the individual tensor components and depends on the orientation of the crystal, the direction and type of the acoustic wave, and the state of optical polarization. The $M_2$ parameter has the dimensions of inverse intensity, i.e. $m^2 W^1$, and the expression for the diffraction efficiency of an acousto-optic modulator produced by a given RF power level always contains the dimensionless term $M_2 I$, where $I=\eta P_{RF}/$area is the acoustic intensity. $P_{RF}$ is the drive power, $\eta$ is the transducer efficiency and "area" represents the area of the acoustic transducer, which for a rectangular transducer of length L and height H will be L×H. Thus large values of $M_2$ are desirable, as a doubling of $M_2$ value leads to a halving of the RF power requirement for a given diffraction efficiency and wavelength.

In general, the amount of RF power required to maintain a given diffraction efficiency (and therefore a given level of loss modulation) grows with the square of the optical wavelength:

$$P_{RF} \propto \lambda^2 \quad (3)$$

as explained, for example, in "Acousto-Optic Devices: Principles, Design and Applications", J Xu and Stroud, Wiley Series in Pure and Applied Optics, ISBN: 0471616389, 1992, high $M_2$ materials are particularly important for acousto-optic devices operating at longer wavelengths.

As an example, fused silica ($SiO_2$) is often used as the acousto-optic interaction medium for Q-switch lasers operating around the 1 micron region. Such lasers typically require several tens of Watts of RF drive power to achieve sufficient loss modulation to hold the laser in the "OFF" state. Typical transducer lengths are 45 mm and heights are 10 mm. The $M_2$ of fused silica is approximately $1.51 \times 10^{-15}$ $m^2 W^{-1}$. Even if silica remained optically transparent at 3 microns, nearly an order of magnitude more RF drive power would be needed to provide similar performance.

Thus what is needed is an acousto-optic modulator that supports shorter (i.e. a smaller value of L) AO crystal in order to keep the Q-parameter low and to be able to fit into shorter laser cavities often used in mid infrared lasers. These shorter modulator devices must still have adequate loss modulation to hold the laser in the "OFF" state. Generally this is incompatible with keeping RF drive powers low, particularly in view of the relationship given in equation (3).

SUMMARY OF THE INVENTION

An acousto-optic modulator comprises a (100), (010) or (001) single crystal silicon acousto-optic interaction medium, and at least one transducer for emitting an acoustic wave attached to the single crystal. The transducer has a first electrode layer disposed on one side and a second electrode layer disposed on its other side. The transducer is aligned to the single crystal AO medium so that the direction of acoustic propagation in the silicon crystal is substantially along the (100), (010) or (001) direction. As used herein, "substantially along" refers to standard manufacturing tolerances, e.g. (+/−)10 to 20 arc-minutes, or better.

In one embodiment, the modulator further comprises Brewster angled end faces at at least one of an optical input or an optical output of the modulator. In this embodiment, the at least one transducer preferably comprises at least a first and a second transducer, wherein the first and second transducer are mounted orthogonally to each other on the silicon crystal.

A Q-switched laser comprises a resonator cavity comprising a high reflecting back mirror, a partially reflecting output coupler, an amplifying laser material between the back mirror and output coupler, and an acousto-optic modulator disposed on either side of the amplifying material between the back mirror and the output coupler. The modulator comprises a single crystal silicon acousto-optic interaction medium, and at least one transducer for emitting an acoustic wave disposed on the substrate, the transducer having a first electrode later disposed on one side of the transducer and a second electrode layer disposed on the other side of the transducer. The silicon crystal is cut and the transducer aligned to the single crystal so that the direction of acoustic propagation in the silicon crystal is substantially along the (100), (010) or (001) direction. In a preferred embodiment, all components of the laser are directly bound together. In one embodiment, Brewster angled end faces can be provided at an optical input or an optical output of the laser. The transducer can comprise at least a first and a second transducer, the first and second transducer mounted orthogonally to each other on the silicon crystal. The amplifying laser material can comprises $Er^{3+}$-YAG.

BRIEF DESCRIPTION OF THE DRAWINGS

A fuller understanding of the present invention and the features and benefits thereof will be accomplished upon review of the following detailed description together with the accompanying drawings, in which:

FIG. 1(a) is a schematic showing a modulator device with input and output (diffracted) beams, and associated k-vector diagram, while FIG. 1(b) shows the associated k-vector diagram in more detail.

FIGS. 4a and 4b are identical because of the cubic symmetry of silicon.

DETAILED DESCRIPTION OF INVENTION

An acousto-optic modulator comprises a single crystal silicon acousto-optic interaction medium, and at least one transducer for emitting an acoustic wave attached to the silicon crystal. The transducer has a first electrode layer disposed on one side of its sides and a second electrode layer disposed on the other side. Single-crystalline silicon is an anisotropic material. The silicon used with the invention is (100), (010) or (001) silicon. The transducer is aligned to the silicon crystal so that the direction of acoustic propagation in the silicon crystal is along the (100), (010) or (001) direction of the silicon crystal. The Inventors have unexpectedly discovered that modulators based on (100), (010) or (001) silicon provide modulators having small footprint modulators which are operable at significantly lower RF power levels, while providing high longitudinal acoustic velocity, as compared to available AO modulators.

Silicon is a face centered cubic crystal. In case of the cubic structures, such as silicon, the Miller index of a plane, based on convention in parentheses, such as (100), are also the coordinates of the direction of a plane normal. Accordingly, the silicon crystal is acquired or cut to provide the (100) plane at its surface. Because of the cubic symmetry of the face-centered cubic silicon crystal, several permutations of the (100) orientation are symmetry-equivalent surfaces, specifically the (010) or (001) plane. The transducer crystal is then placed or otherwise formed on the (100), (010) or (001) silicon plane. The present invention can generally utilize cubic crystals other than Si, such as Germanium. However, Germanium is generally less useful in the present context (Q-switches) for most applications because Ge has limited optical power handling capacity compared to silicon.

For the face-centered cubic crystal there are a total of 6 faces related by the symmetry elements and equivalent to the (100) surface. Any surface belonging to this set of symmetry related surfaces is by convention denoted by the more general notation {100}, where the Miller indices of one of the surfaces is enclosed in curly-brackets. Accordingly, although the invention is generally been described where the acoustic velocity V propagates along (100) direction, and the optical polarization direction is close to the (100) direction, instead of (100), (010) or (001), can be substituted and the results are unchanged.

Figure 1:
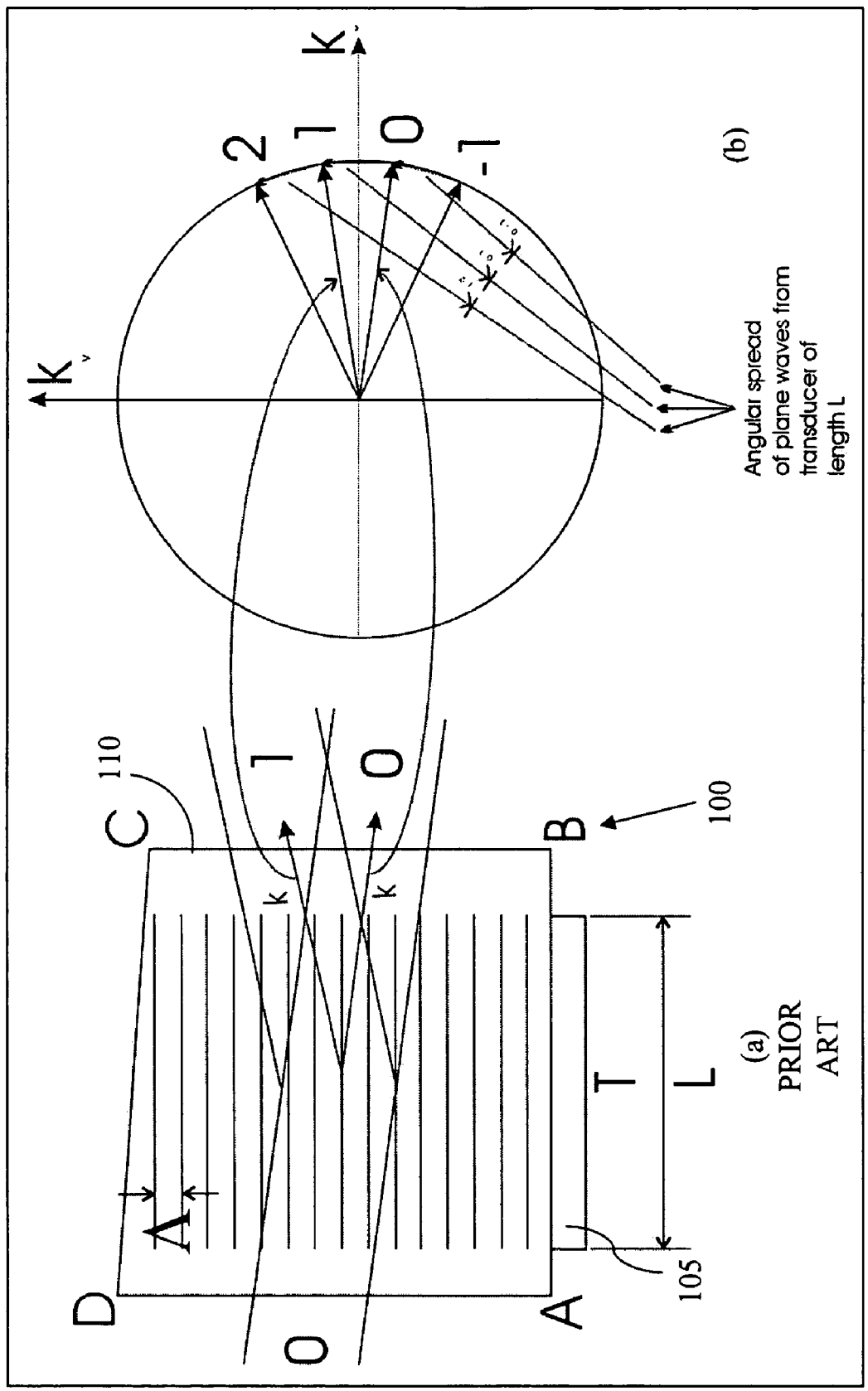
Figure 2:
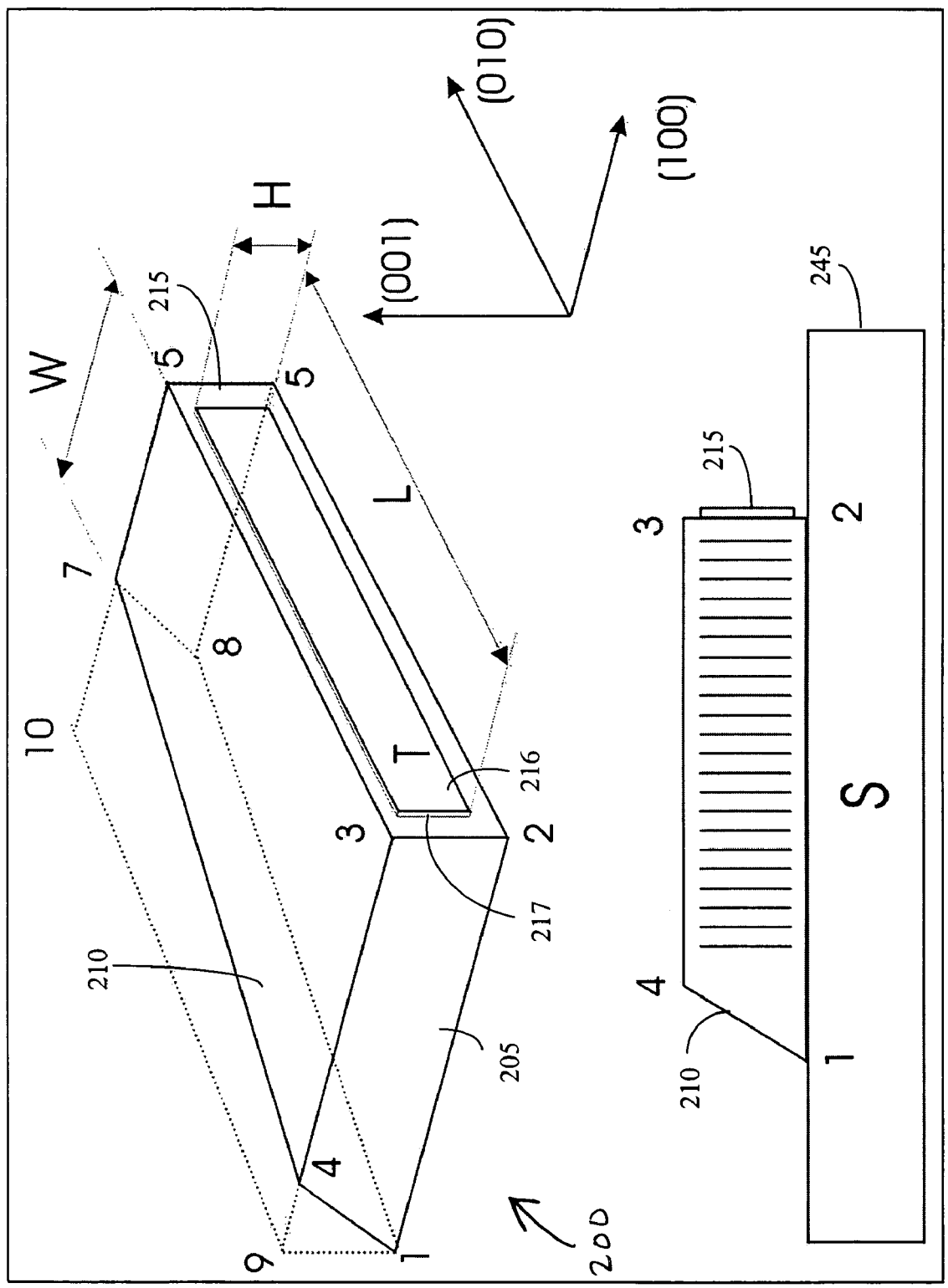
FIG. 2 is a schematic of an exemplary silicon Q-switch according to the invention, showing transducer, acoustic wedge (to frustrate reflection of acoustic energy back into transducer), and definitions of the various relevant dimensional parameters.

FIG. 2 shows a Q-switch 200 according to the invention, showing transducer 215, silicon AO medium 205 includes acoustic wedge 210 cut in the AO medium 205 to frustrate reflection of acoustic energy back towards transducer 215. Top electrode layer 216 and bottom electrode layer 217 sandwich transducer 215. Definitions of various dimensional parameters are also provided. Transducer 215 is disposed on the (100) plane, or equivalent planes, of AO medium 205. As noted in the background, in some cases, and to ensure more complete absorption to frustrate reflections back into the transducer 215, optionally a surface 210 having a second wedge angle is introduced in AO medium 205, as shown in FIG. 2. In this case, the acoustic energy is deflected into an absorbing substrate, S, 245, such as aluminum, whose acoustic impedance is close to that of the silicon AO medium 205 for longitudinal waves.

The (100), (010) and (001) plane/orientation of the silicon crystal together with an optical polarization direction close to the selected direction has been found to provide a substantially higher acousto-optic figure of merit ($M_2$) value as compared to earlier disclosed modulators. Silicon having the orientation as described above has unexpectedly been found by the present Inventors to provide an advantageous combination of parameters, which make it highly useful for applications including Q-switched lasers operating in the range from about 2-7 microns. For example, using this newly identified orientation of single crystal silicon for modulators, modulators according to the invention are operable at substantially lower modulator drive power levels than previously disclosed modulators. Specifically, the Inventors have recorded a 90% loss modulation (i.e. 90% of the light deflected out of the input beam) with an applied RF power of 45 Watts at a frequency of 27 MHz. The device had an interaction length of 45 mm, and a transducer having a top electrode height of approximately 8 mm.

A paper by Carleton and Soref entitled "Modulation of 10.6 micron laser radiation by ultrasonic diffraction", by H. R., Carleton and R. A. Soref, Applied Physics Letters, Vol. 9, No. 3, p 110-112, 1966 discloses a $CO_2$ laser operating at 10.6 microns acousto-optically modulated using a transducer coupled to (111) single crystal silicon. The (111) direction was also the direction of polarization of the optical beam. However, unlike the present invention, the silicon crystal in Carleton was cut so that the direction of acoustic propagation was along the (111) direction. A value of $M^2=6\times10^{-15}$ $m^2W^{-1}$ was reported by Carleton. As noted below, modulators according to the present invention provide $M_2=11\times10^{-15}$ $m^2W^{-1}$, or nearly twice the $M_2$ value reported by Carleton. Optical losses at 10.6 μm, where the Carleton measurements were made, prohibit its use as a q-switch.

Figure 3A:
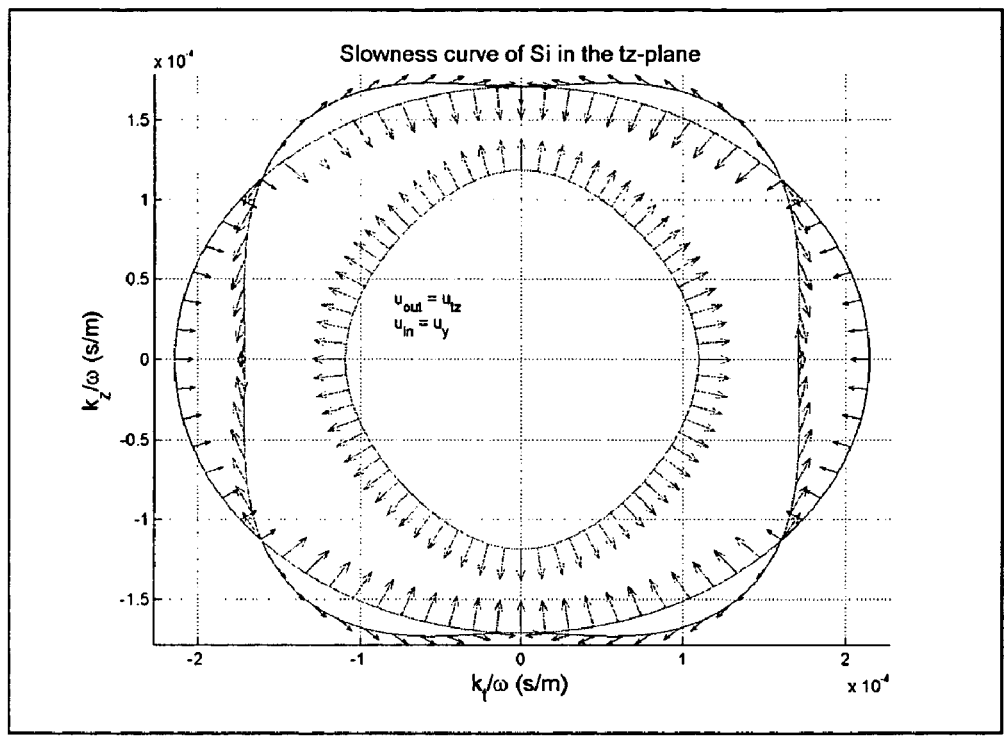
FIG. 3(a) shows a slice through slowness surface for silicon in the plane containing the (110) and (001) directions. Arrows represent particle displacement vectors, in-plane component is drawn outside, out of plane component is drawn inside. Inner curve represents the longitudinal mode.
Figure 3B:
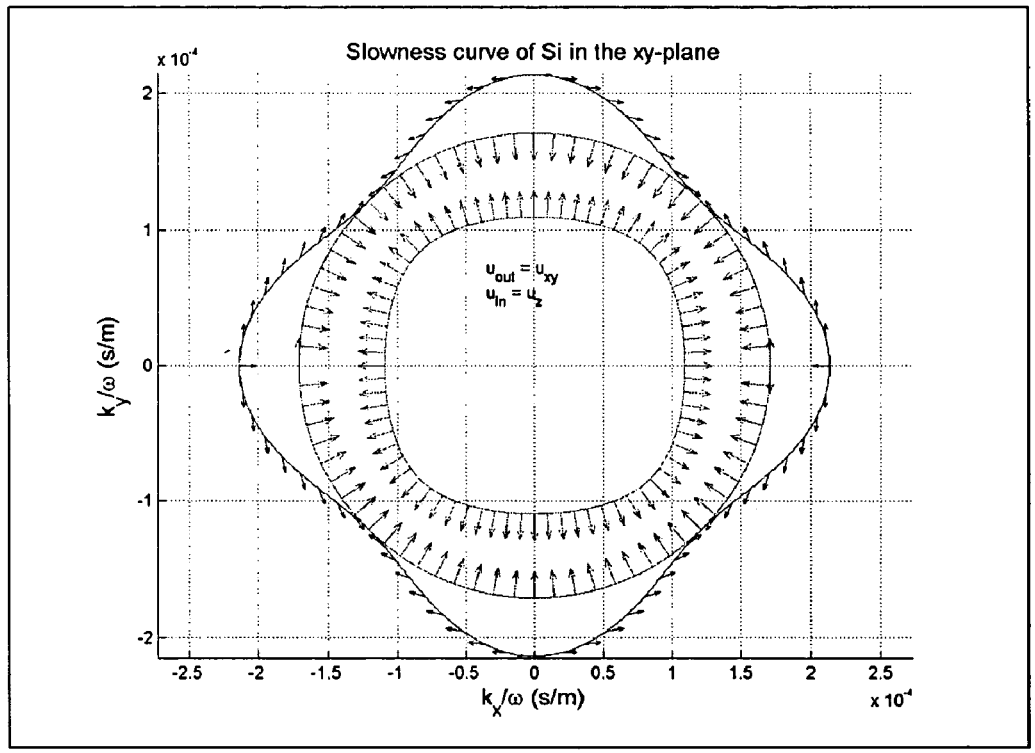
FIG. 3(b) shows a slice through slowness surface for silicon in the plane containing the (100) and (010) directions.

FIGS. 3(a) and (b) show how the acoustic velocity varies with direction for single crystal silicon, both in the (110)-(001) plane, and in the (100)-(010) plane, respectively. The (100)-(010) plane represents planes according to the invention. These represent two orthogonal "slices" through the 3-dimensional acoustic dispersion surfaces, also known as slowness surfaces. This orientation has higher acoustic velocities and therefore faster switching times which is advantageous for laser Q-switching applications and for optical modulators and switches in general. The RF power requirements will generally be in the ratio of the $M_2$ values for the two orientations, so a reduction in power of approximately (6/11) will be achieved for the orientation according to the invention. This is nearly a factor of 2 reduction in drive power and is highly desirable, as it reduces cost of associated electronics, power consumption, and eases problems with heat management associated with the device.

Figure 4A:
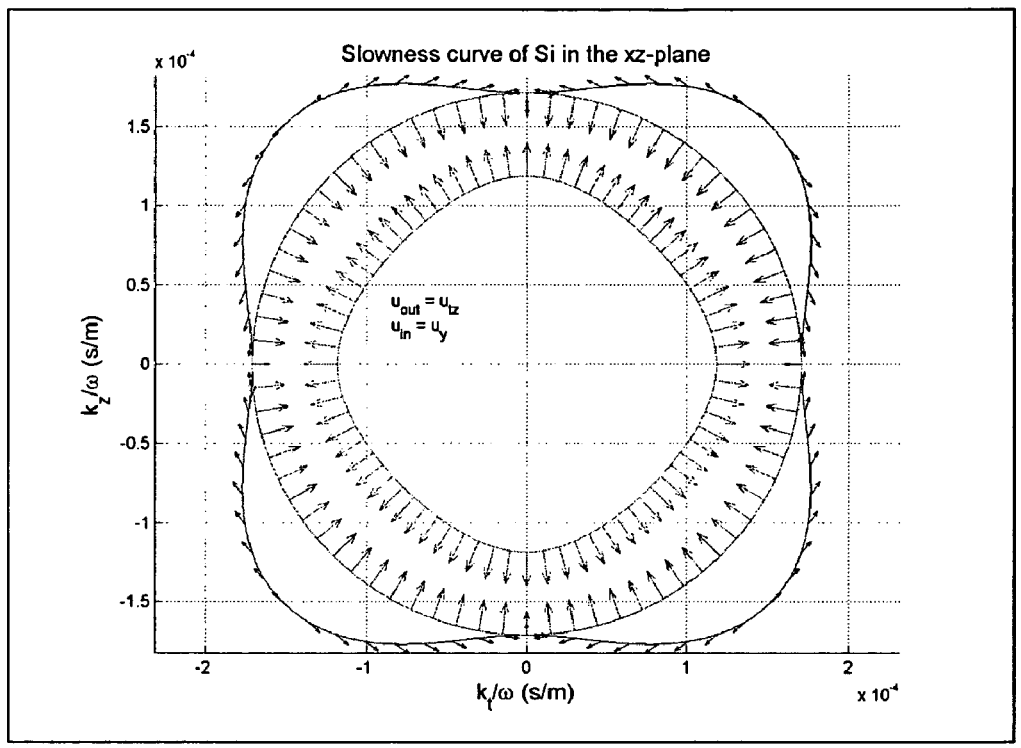
FIG. 4(a) shows a slice through slowness surface for silicon in the plane containing the (100) and (001) directions. Arrows represent particle displacement vectors, in-plane component is drawn outside, out of plane component is drawn inside.
Figure 4B:
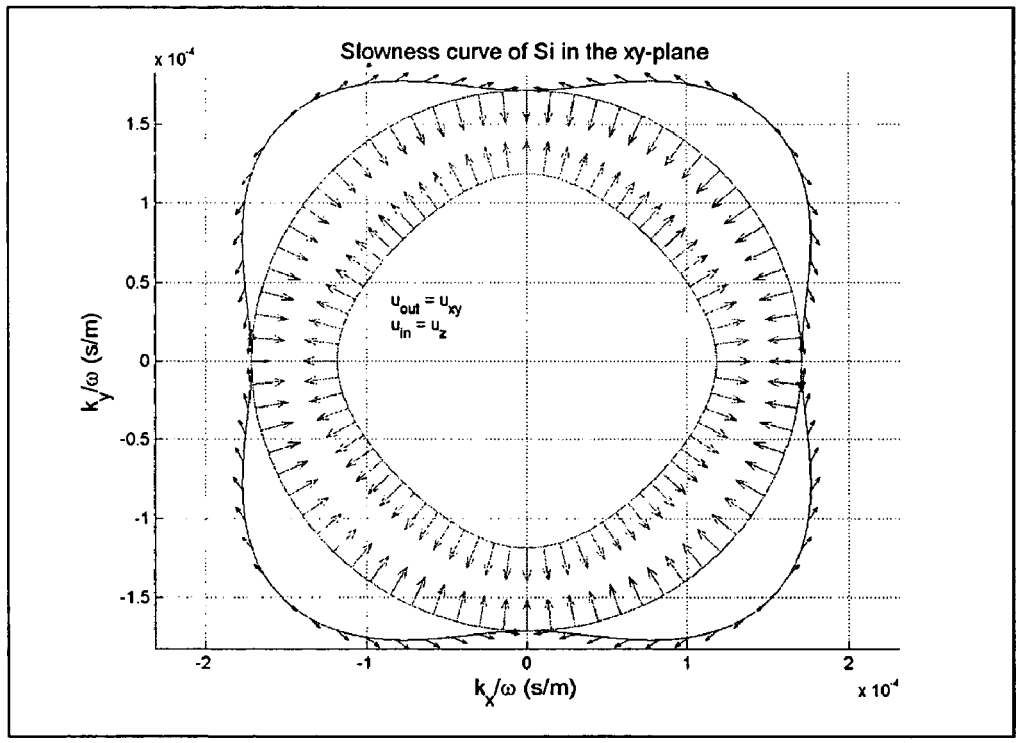
FIG. 4(b) shows a slice through slowness surface for silicon in the plane containing the (100) and (010) directions.

FIG. 4(a) and (b) show how the acoustic velocity varies with direction for single crystal silicon, both in the (100)-(001) plane and in the (100)-(010) plane, both according to the invention. These are called acoustic slowness surfaces because the radial distance from the origin to a point on a curve represents 1/(acoustic velocity) for that direction. For any given direction, there are in general 3 intersections of the radius vector with the slowness surface, as there are 3 distinct acoustic waves capable of propagating in any direction, two quasi-shear waves and a quasi-longitudinal wave, the 3 distinct particle displacement vectors forming an orthogonal triple. The arrows decorating the slowness surfaces are for the purpose of indicating the particle displacement eigen-directions, arrows pointing outwards show the in-plane component, pointing inwards shows the out-of-plane component.

In particular, the innermost (fastest) dispersion locus corresponds to the longitudinal acoustic wave, and the eigenvectors pointing out radially show that the particle displacement is almost in the direction of the wave propagation, as it should for a longitudinal wave. In order to find $M_2$ in equation (2), it is necessary to find the velocity and the effective strain-optic coefficient.

Based on the method disclosed in Xu and Stroud entitled "Acousto-Optic Devices: Principles, Design and Applications", J Xu and Stroud, Wiley Series in Pure and Applied Optics, ISBN: 0471616389, 1992, the following quantity is constructed:

$$p_{\text{eff}} = l_K^{01} p_{KL} l_{Kj} l_j^V \quad (4)$$

where $$l_K^{01} = [l_x^0 l_y^1, l_y^0 l_x^1, l_z^0 l_z^1, l_y^0 l_z^1 + l_z^0 l_y^1, l_x^0 l_z^1 + l_z^0 l_x^1, l_x^0 l_y^1 + l_y^0 l_x^1] \quad (5)$$

$$p_{KL} = \begin{bmatrix} p_{11} & p_{12} & p_{12} & 0 & 0 & 0 \\ p_{12} & p_{11} & p_{12} & 0 & 0 & 0 \\ p_{12} & p_{12} & p_{11} & 0 & 0 & 0 \\ 0 & 0 & 0 & p_{44} & 0 & 0 \\ 0 & 0 & 0 & 0 & p_{44} & 0 \\ 0 & 0 & 0 & 0 & 0 & p_{44} \end{bmatrix} \quad (6)$$

$$l_j^V = [l_x^V \ l_y^V \ l_z^V] \quad (7)$$

$$l_{jK} = \begin{bmatrix} l_x & 0 & 0 & 0 & l_z & l_y \\ 0 & l_y & 0 & l_z & 0 & l_x \\ 0 & 0 & l_z & l_y & l_x & 0 \end{bmatrix} \quad (8)$$

In equation (4) summation over repeated indices is implicit, upper case letters run from 1 to 6, lower case from 1 to 3. The quantity $l^{01}_K$ is the 6-vector constructed from the direction cosines of the input ("0") and output ("1") optical polarization directions, as this interaction preserves polarizations, $1^0_x = 1^1_x$, $1^0_y = 1^1_y$, $1^0_0 = 1^1_z$ etc.

The quantity $p_{KL}$ is the strain-optic tensor for silicon, and contains 3 independent components as determined by the symmetry of the silicon FCC crystal. The numerical values are known, and have been measured and reported by Bieglesen ("Photoelastic tensor of silicon and volume dependence of the average gap", D K Bieglesen, Physical Review Letters, Vol. 32, No. 21, p 1196-1199, 1974, also Erratum to this paper: Physical Review Letters, p 51, Vol. 32, 1974. and "Frequency dependence of the photoelastic coefficients of Silicon", D K Bieglesen, Physical Review B, Vol. 12, No. 6, p 2427-2431, 1975).

The quantity $l^V_j$ is the unit vector representing the particle displacement field of the acoustic wave. As the principal interest is in longitudinal wave since shear waves give rise to very low values of $p_{\text{eff}}$ which generally do not yield useful acousto-optic devices), $l^V_j$ effectively points along K, the acoustic wave direction. Finally, the quantity $l_{jK}$ defined in equation (8) is a (3×6) matrix made of the direction cosines of the acoustic wave-vector K.

If the measured numerical values of the p-coefficients are taken, and the acoustic wave is allowed to propagate in the (111) direction so that $$l_j^V = \frac{1}{\sqrt{3}}(1 \ 1 \ 1),$$

it is found that $p_{\text{eff}} = -0.094$.

The Inventors have also found for this direction V=9.31 k ms$^{-1}$, which with the density of $\rho = 2328.3$ kgm$^{-3}$ and a refractive index of 3.47 gives a value of $M_2 = 6.5 \times 10^{-15}$ m$^2$W$^{-1}$, for the polarization direction of the optical beam which is parallel to the direction of the acoustic wave.

The Inventors found that using a different crystal orientation other than (111), a substantially higher $M_2$ is provided. Specifically, if the acoustic velocity V is chosen along the (100) or equivalent directions, it has been found that a substantially higher value of $M_2 = 11 \times 10^{-15}$ m$^2$W$^{-1}$ can be achieved, again with the optical polarization aligned close to the acoustic direction. The selection of the (100) orientation also results in a 40% reduction in the required RF power. In such an orientation, the effective Pockels coefficient as calculated using equations (4)-(8) is slightly smaller in magnitude, at -0.094, leading to a reduced $M_2$ value according to equation (2). However, the reduction in the $M_2$ value is adequately compensated by the reduction in the acoustic velocity from 9.31 kms$^{-1}$ to 8.44 kms$^{-1}$. This reduction in the acoustic velocity is significant because $M_2$ is proportional to 1/(acoustic velocity).

Because of the exceptionally high longitudinal acoustic velocity in silicon (100) and equivalents (8.44 kms$^{-1}$), the switching speed of modulators according to the invention, as measured by the rise and fall times of the optical pulse, will be relatively short. The rise time $\tau$ for an acousto-optic modulator is given by the equation below:

$$\tau = D/V$$

where D is the diameter of the light (e.g. laser) beam in the region of the interaction and V is the velocity of sound in the material. A short rise time is particularly advantageous when optical beams have to be kept large to avoid risk of optically induced damage. For example, a beam of 3 mm diameter will be switched in approximately 0.35 μs.

In one embodiment of the invention, an essentially polarization independent acousto-optic modulator is provided. In both the known (111) orientation Si modulator and the (100) principal axis orientation (and equivalent orientations) Si modulator according to the invention, the modulator is sensitive to the optical polarization state. For example, if the (linear) optical polarization direction is rotated 90° relative to the direction of acoustic wave propagation, then $p_{\text{eff}}$ changes, being made up of a different combination of the tensor components depicted in equation (6), with the new $p_{\text{eff}}$ being two orders of magnitude smaller, yielding an unusably low value of $M_2$. If it is desired that the loss modulation produced by the modulator is made substantially insensitive to the optical polarization state, then the multi-transducer modulator arrangement shown in FIG. 5 may be used.

Figure 5:
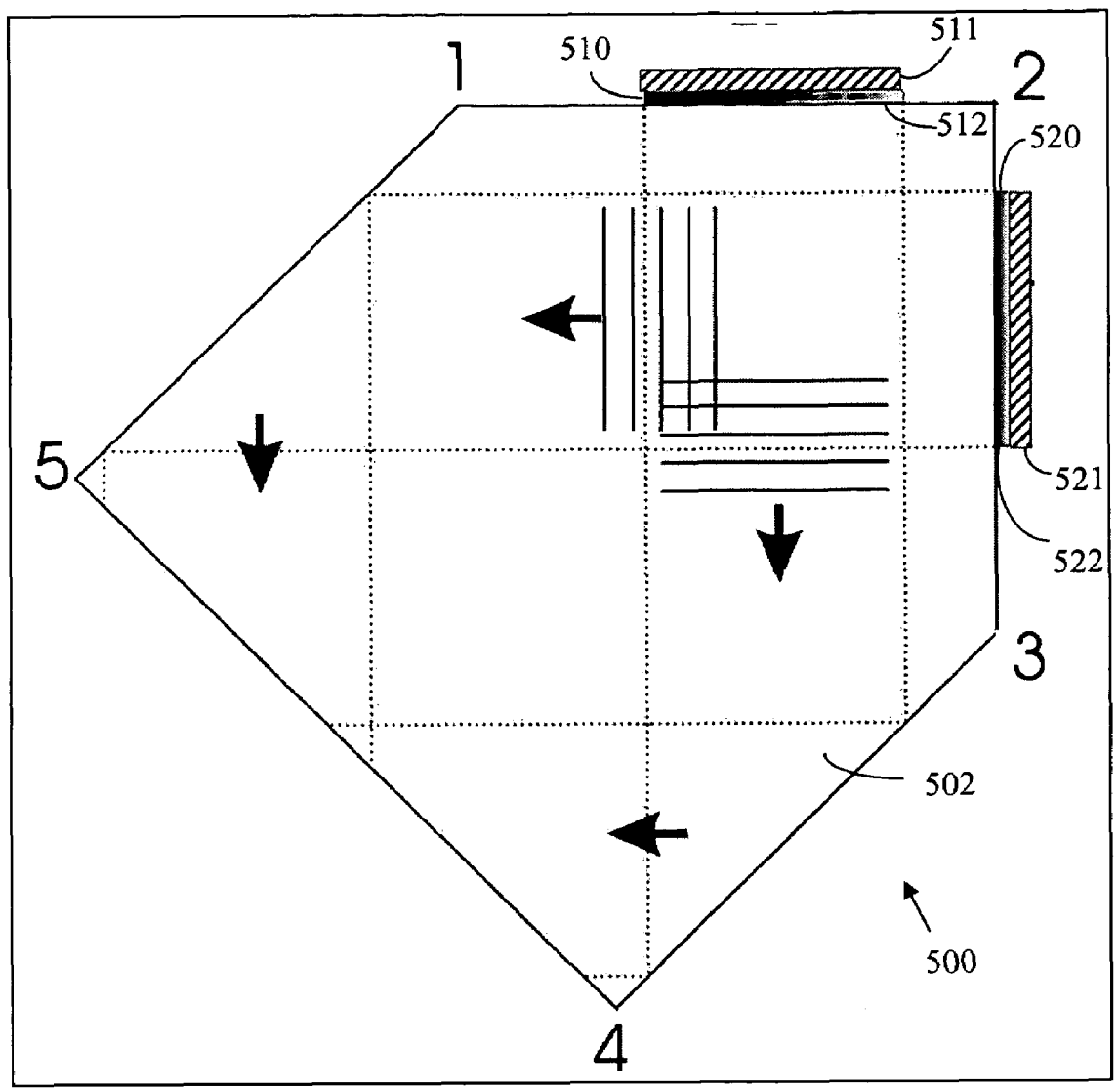
FIG. 5 shows one possible realization of a polarization insensitive acousto-optic modulator according to the invention. In one region, both acoustic waves are present, propagating orthogonal to one another.

Referring to FIG. 5, a modulator 500 according to the invention includes two acoustic transducers, 510 and 520, mounted orthogonally to each other, on the same crystal of silicon AO material 502. Transducers 510 and 520 include top and bottom metal layers 511/512 and 521/522, respectively. Transducer 510 is mounted on face 12, such as the (100) face, while transducer 520 is mounted on face 23, such as the (010) or (001) face, these faces being orthogonal to one another. After passing through a region where the acoustic signals overlap, the acoustic beams generated impinge on the slanted faces 34 (for the beam generated by transducer 510) and 15 (for the beam generated by transducer 520). Materials chosen for high acoustic absorption and thermal conductivity are bonded or otherwise attached onto slanted faces 34, 45, and 51 (not shown). Because of the crystal symmetry of silicon, it is sufficient for the beams from transducers 510 and 520 to be aligned with any of the principal axes (100),(010),(001). This is generally preferable to a situation where two modulators each having single (separate) transducers are placed in series, with the second rotated 90° relative to the first, because the length of the modulator is unchanged using modulator 500.

The unusually high thermal conductivity of silicon (150 Wm$^{-1}$K$^{-1}$ compared to 1.4 Wm$^{-1}$K$^{-1}$ for fused silica) facilitates efficient extraction of heat caused by the absorption of the acoustic waves, and by heat generation in the transducers themselves for modulators according to the invention. This aspect of the present invention facilitates both dual transducer modulators and modulator use for high average power RF applications.

Brewster Angled Acoustic-Optic Modulator

The high refractive index of silicon (approximately 3.47 at 3 microns) generally necessitates the use of antireflection coatings in order to reduce Fresnel reflection losses. However, it is desirable in some circumstances to exclude coatings in the optical path. Instead, a Brewster angled surfaces may be used at the optical input and/or the output of the silicon acousto-optic device. In order to reduce the large value of the Brewster angle (needed because of the large refractive index value of silicon), direct bonding techniques such as diffusion bonding can be used to join the modulator to other materials of lower refractive index, and particular to the laser host material, thus reducing the interface angle and/or to allow the laser medium and the Q-switch to be fabricated as a monolithic structure. Such an arrangement has advantages including size, reliability and optical damage threshold. It has been demonstrated for example, that doped and undoped YAG can be bonded together, borosilicate glass and silicon, silicon and silicon nitride, or silicon and various borosilicate glasses. In one embodiment, optical contacting or direct bonding of silicon and YAG or other laser host material with or without the deposition of intermediate glassy or crystalline films is used to facilitate the jointing process and ease the mismatch in thermal expansion coefficients.

Figure 6:
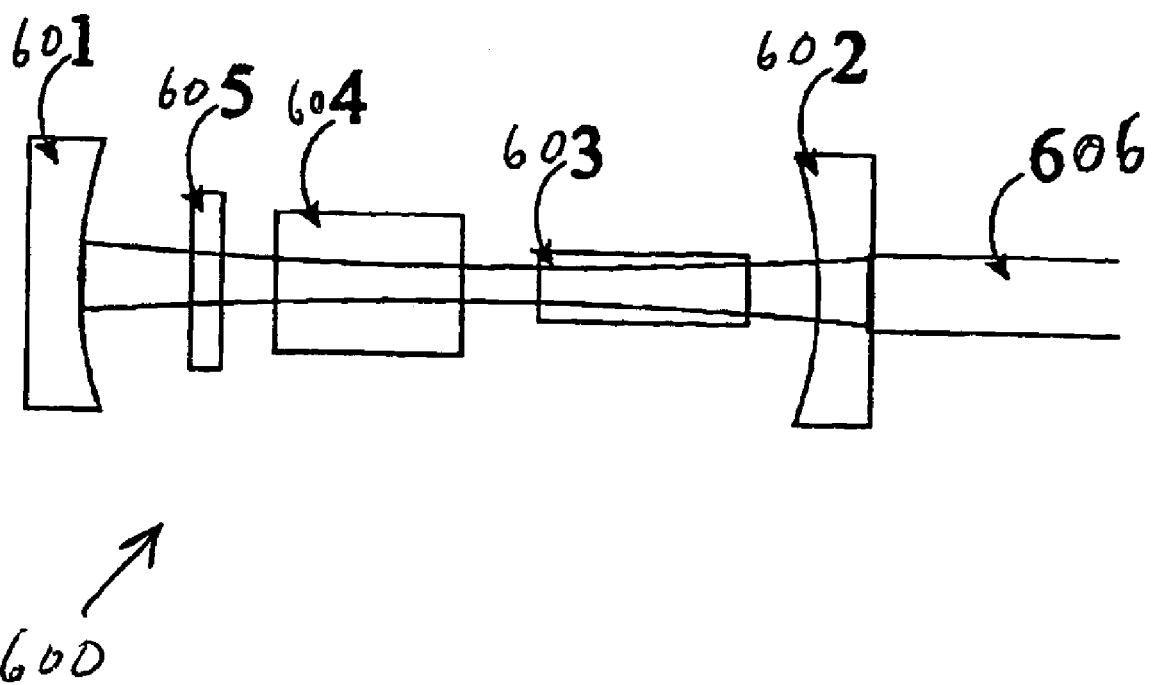
FIG. 6 shows a pulsed q-switched laser according to an embodiment of the invention.

FIG. 6 shows a pulsed q-switched laser 600 according to an embodiment of the invention. Pulsed laser 600 is based on a linear resonator cavity design and comprises a high reflecting back mirror 601, a partially reflecting output coupler 602, an amplifying laser material 603 and a switch comprising active Q-switch 604 (electronic driver not shown) and optional saturable absorber 605. The Q-switch is inside the laser cavity and through switching triggered by its electronic driver allows laser 600 to provide a pulsed high power laser output 606 that consists of smooth pulses with a Fourier-Transform-Limited pulse envelope. For example, in one embodiment the amplifying laser material comprises Er$^{3+}$-YAG to provide operation at around 2.94 μm.

Using bonding techniques described above, laser 600 can be a monolithic structure. Moreover, using known fabrication techniques, it may be possible to fabricate integrated q-switched solid state laser microchips according to the invention. For example, the process described in U.S. Pat. No. 6,263,004 to Arvidsson may be used to form the complete q-switched laser assembly integrated on a single chip or substrate to facilitate temperature control and heat removal. In this embodiment according to the present invention, the optical parts are self aligned onto the substrate (e.g. Si (100) substrate) which reduces the construction size and facilitates mass production.

In one embodiment, laser 600 is a q-switched mid infrared laser, for example an Er$^{3+}$ laser operating at ~3 microns. Although described above as an internal modulator as a Q-switch inside the laser cavity, q-switches according to the invention can also be used as external modulators.

The silicon crystal can either be intrinsically pure material or intentionally doped with impurities. Doping is known to provide certain advantages, including increased optical transmission, increased optical damage threshold and/or enhanced mechanical properties. It will not generally substantially affect the acoustic properties. For example, doping will not result in a significantly enhanced M$_2$ value. The Q-switch may be operated in the Bragg, Raman-Nath or intermediate diffraction regimes, the exact configuration being determined during the process of optimizing the Q-switch operation for a particular wavelength.

It is to be understood that while the invention has been described in conjunction with the preferred specific embodiments thereof, that the foregoing description as well as the examples which follow are intended to illustrate and not limit the scope of the invention. In particular, in the description of the invention as a Q-switch, by necessity, the Q-switch is placed inside the laser cavity. However, as noted above switches according to the invention may also be used as an external modulator. In this external arrangement, the laser is run continuously; the modulator and resulting modulation is accomplished outside of the laser cavity.

We claim:

1. An acousto-optic modulator, comprising:
    a (100), (010) or (001) single crystal silicon acousto-optic interaction medium, and
    at least one transducer for emitting an acoustic wave attached to said single crystal, said transducer having a first electrode layer disposed on one side of said transducer and a second electrode layer disposed on the other side of said transducer, wherein said transducer is aligned to said single crystal so that the direction of acoustic propagation in said silicon crystal is along the (100), (010) or (001) direction.

2. The modulator of claim 1, further comprising Brewster angled end faces at at least one of an optical input or an optical output of said modulator.

3. The modulator of claim 2, wherein said at least one transducer comprises at least a first and a second transducer, said first and second transducer mounted orthogonally to each other on said silicon crystal.

4. A Q-switched laser, comprising:
    a resonator cavity comprising a high reflecting back mirror;
    a partially reflecting output coupler,
    an amplifying laser material between said back mirror and said output coupler, and
    an acousto-optic modulator disposed on either side of said amplifying material between said back mirror and said output coupler, said modulator comprising a single crystal silicon acousto-optic interaction medium, and at least one transducer for emitting an acoustic wave disposed on said substrate, said transducer having a first electrode later disposed on one side of said transducer and a second electrode layer disposed on the other side of said transducer, wherein said silicon crystal is cut and said transducer is aligned to said single crystal so that the direction of acoustic propagation in said silicon crystal is along the (100), (010) or (001) direction.

5. The laser of claim 4, wherein all components of said laser are directly bound together.

6. The laser of claim 4, further comprising Brewster angled end faces at at least one of an optical input or an optical output of said laser.

7. The laser of claim 4, wherein said at least one transducer comprises at least a first and a second transducer, said first and second transducer mounted orthogonally to each other on said silicon crystal.

8. The laser of claim 4, wherein said amplifying laser material comprises $Er^{3+}$-YAG.

* * * * *